Mar. 27, 1923.

R. GREENWOOD.
APPARATUS FOR HEATING AIR.
FILED APR. 3, 1922.

1,449,598.

Mar. 27, 1923.

R. GREENWOOD.
APPARATUS FOR HEATING AIR.
FILED APR. 3, 1922.

1,449,598.

Inventor.
Rowland Greenwood,
By B. Sniger, Atty

Patented Mar. 27, 1923.

1,449,598

UNITED STATES PATENT OFFICE.

ROWLAND GREENWOOD, OF CARLISLE, ENGLAND, ASSIGNOR OF ONE-HALF TO CARR & COMPANY, LIMITED, OF CARLISLE, ENGLAND, A BRITISH COMPANY.

APPARATUS FOR HEATING AIR.

Application filed April 3, 1922. Serial No. 549,344.

*To all whom it may concern:*

Be it known that I, ROWLAND GREENWOOD, a subject of the King of Great Britain and Ireland, residing at 4 Morton Terrace, Wigton Road, in the city of Carlisle and county of Cumberland, England, have invented a new and useful Apparaus for Heating Air, of which the following is a specification.

This invention relates to apparatus for heating air and has reference to a plant for supplying heated air for such purposes as plenum ventilation, domestic and hotel cooking, heating timber drying sheds and baking biscuits. In such plant the heated air must not have been in contact with any combustion products and must be at a uniform high temperature.

It is the object of the present invention to provide a heater which will fulfill the foregoing conditions and one by which a continuous circulation of air may be maintained between heater and oven or the like after the first heating of fresh air supplied to the latter. As air used in baking or drying chambers is frequently exhausted therefrom whilst still in a highly heated condition it is possible by means of the heater which is the subject of the present invention to maintain a continuous supply of air at a uniform temperature without necessitating the use of excessive quantities of heating medium which may be of gaseous, liquid or solid form.

According to the invention a number of conduits or flues are disposed within a casing each of such conduits being heated by the combustion of fuel therein, a number of heat distributing elements to the interior of which the products of combustion have access being arranged on the exterior of the conduits in such a manner that air is caused to take a tortuous path around them for the purpose of obtaining a uniformly heated product. It is preferred that the heat distributing elements should be cylindrical in form, grooved externally or provided with fins whilst where a number of conduits so provided are employed, baffles may be utilized for the purpose of compelling the air under treatment to pass over or around all of such conduits in series.

Where the invention is applied to the heating of an apparatus where exhaust air is returned for reheating (as in the oven described in our prior British specification No. 12659/1921.) a fan is disposed in the conduit by which air leaves the heater to maintain a uniform circulation.

Reference will now be made to the accompanying drawings which illustrate by way of example air heaters constructed in accordance with the invention and in which:—

Figure 1:
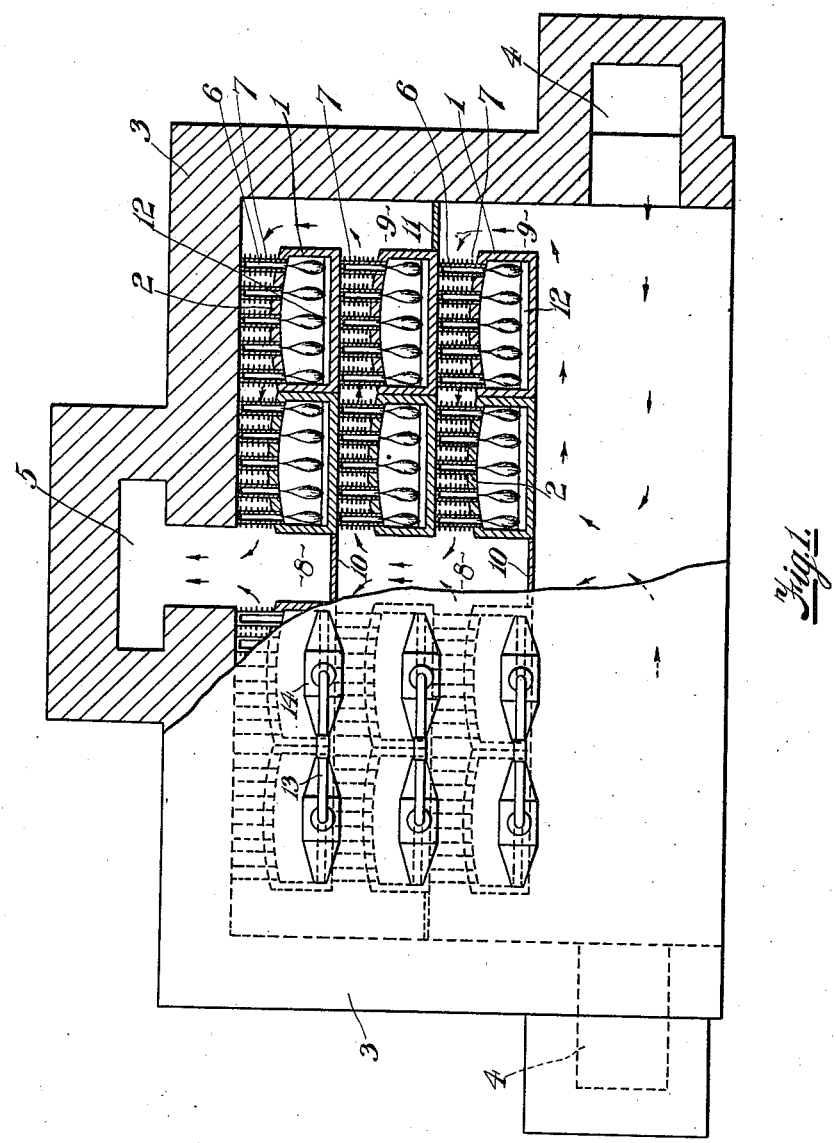
Figure 1 is partly an elevation and partly a cross section of an air heater adapted for the use of gas or oil fuel.
Figure 2:
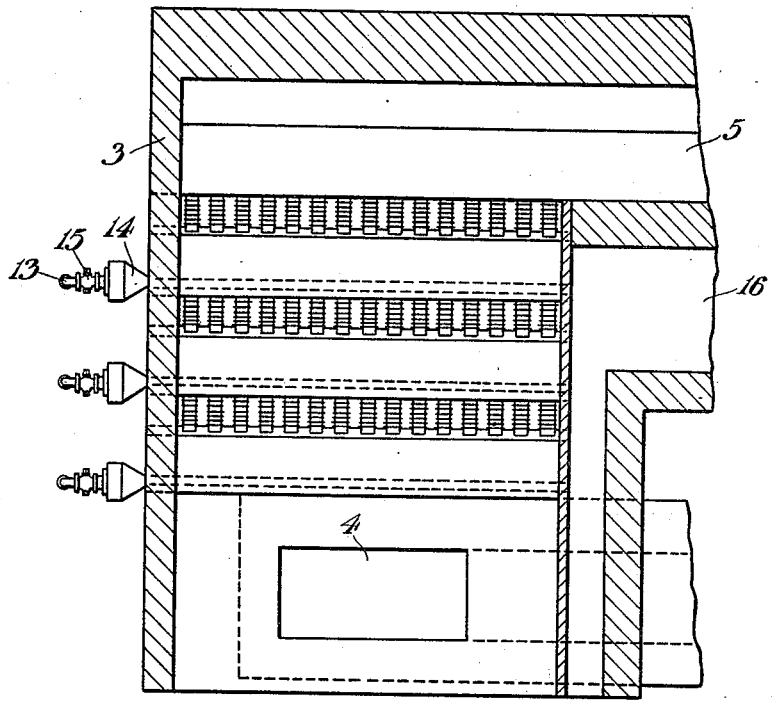
Figure 2 is a longitudinal sectional elevation of the same.
Figure 3:
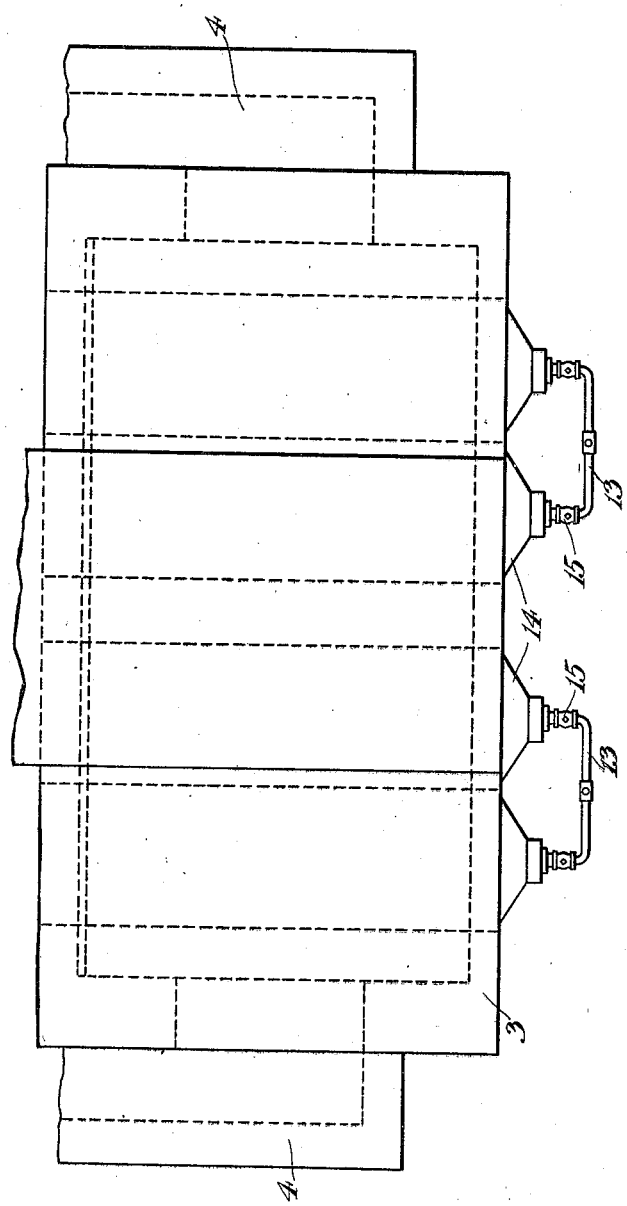
Figure 3 is a plan of the heater shown in Figures 1 and 2.

The heater illustrated in Figures 1 to 3 comprises a number of conduits 1 of substantially rectangular cross section preferably having convex upper surfaces 2 and extending through a casing 3. Atmospheric air or air exhausted from an oven enters the casing 3 through inlets 4 in the base of the casing and whilst passing upwards is caused, as hereinafter described, to pass across the tops of the conduits 1 until it leaves by an outlet 5 in the top of the casing 3.

From the upper surface 2 of each conduit project a number of heat distributing members 6 preferably of cylindrical form and each provided with fins 7.

The conduits 1 may be conveniently disposed as shown in two groups, each group comprising a number of superimposed pairs of closely adjacent conduits leaving a central passage 8 between the two groups of conduits and side passages 9 between each group and one wall of the casing 3. The passage 8 is bridged by baffles 10 extending between alternate pairs of conduits whilst the passages 9 are bridged by baffles 11 alternating vertically with the baffles 10.

Within each conduit are disposed rows of gas burners 12 each jet being disposed substantially vertically beneath one of the heat distributors 6. The gas inlet pipes 13 extend beyond the front ends of the conduits 1 and are connected to gas trunks 14, said inlet pipes being provided with suitable control valves 15. The front end of each conduit is adapted for the entry of air for combustion by induction or forced draught whilst the opposite end is connected to a flue 16 for the outlet of gases of combustion.

In operation air entering at the openings 4 is diverted by the lowermost baffles 10 towards each side of the casing 3 and ascends the passages 9 until it encounters the lowermost baffles 11 which cause the two streams of air again to flow towards the passage 8. In this manner the air is compelled to pass across the upper surfaces of each pair of conduits 1 and is broken up by the heat distributors 6 which owing to their number and arrangement effect a very rapid and uniform heating of the air, every particle of which is brought into intimate and repeated contact with a flame heated surface.

The heater above described may be adapted readily to the use of liquid fuel by substituting appropriate burners for the gas burners described and shown.

Figure 4:
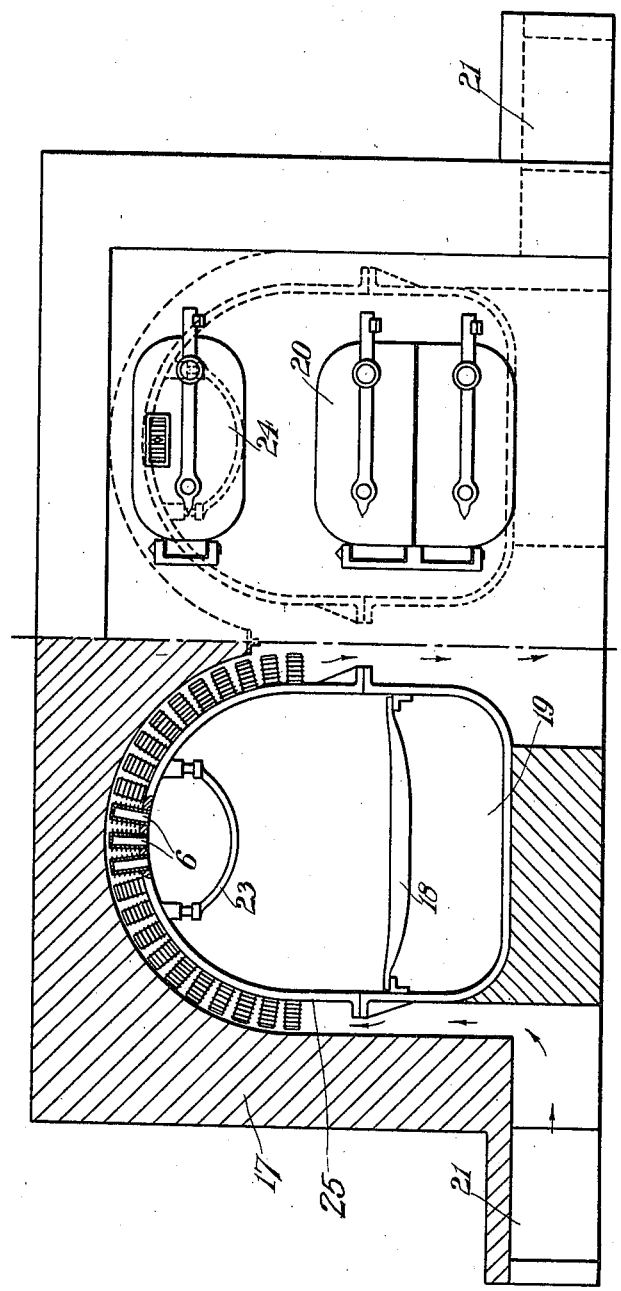
Figure 4 is an elevation partly in section of a modified form of heater adapted for the use of hard fuel.
Figure 5:
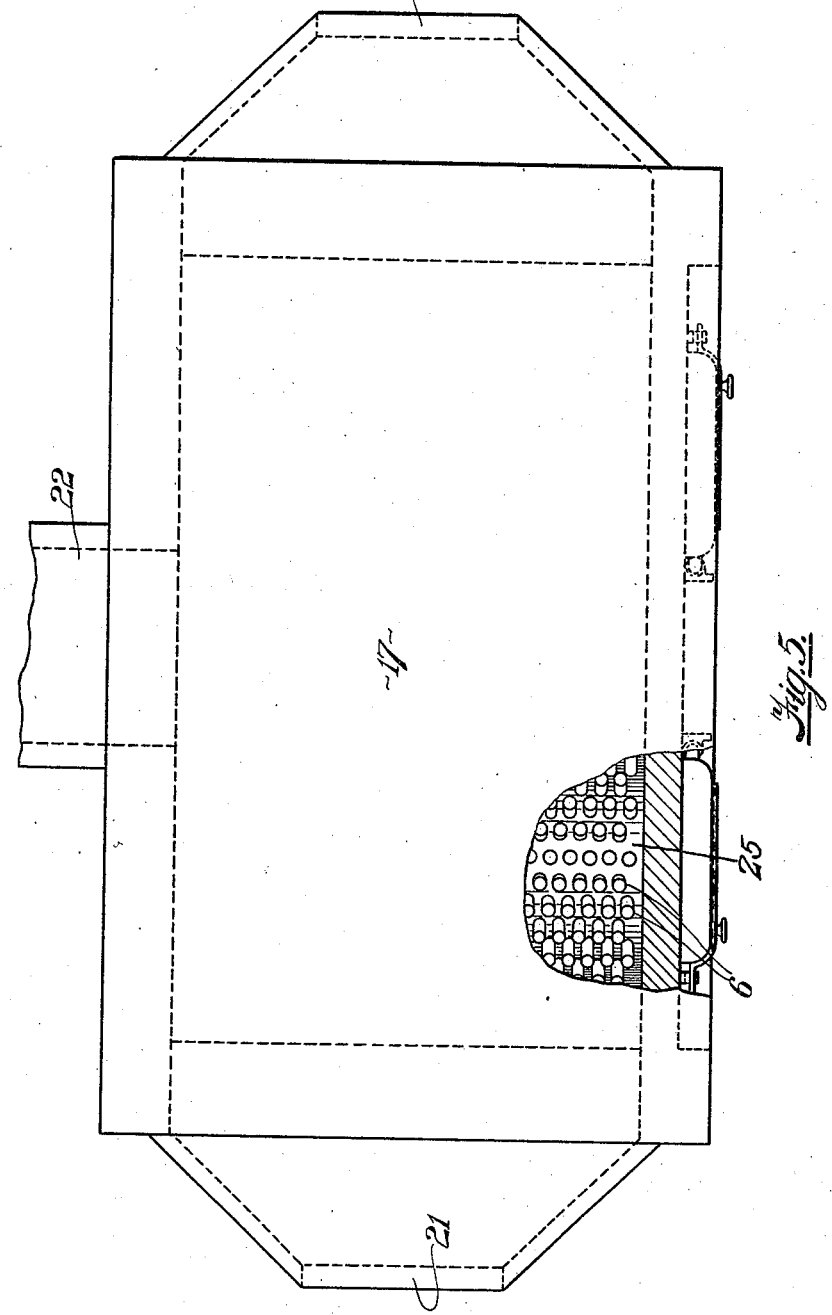
Figure 5 is a plan partly in section of the arrangement shown in Figure 4.

In Figures 4 and 5 are shown an air heater similar in many respects to that already described but adapted for burning coke, coal or other hard fuel. In this construction the conduits 1 are replaced by flues 25 arranged in a setting 17 of fire brick or the like and having grate bars 18 for the reception of fuel disposed above an ashpit 19, access to grate or ashpit being by means of door 20. The upper portion of each flue 16 is formed preferably of semicircular cross section and provides a circulating space for the gases of combustion.

Heat distributing elements 6 similar in construction to those already described are disposed radially around the curved outer surface of each flue 16 throughout its length sufficient space being left between the walls of the setting 17 and the flue to accommodate the members 6. This space is in constant communication with air inlets 21 and a hot air outlet 22 which in the form of construction illustrated is common to both flues.

Within the arch of each flue is disposed a series of partially circular baffle plates 23 disposed transversely to the longitudinal axis of the flue and arranged for the purpose of ensuring an equal distribution of gases of combustion to all parts of the surface to be heated.

It is to be noted that the heat distributing elements 6 are arranged in rows longitudinally of the flues, the elements in each row being staggered relatively to those in adjacent rows in order to ensure that air entering at 21 shall take a tortuous path in reaching the outlet 22 which it reaches in a uniformly heated condition.

It is preferred to provide each flue with a door 24 for inspection and cleaning.

Figure 6:
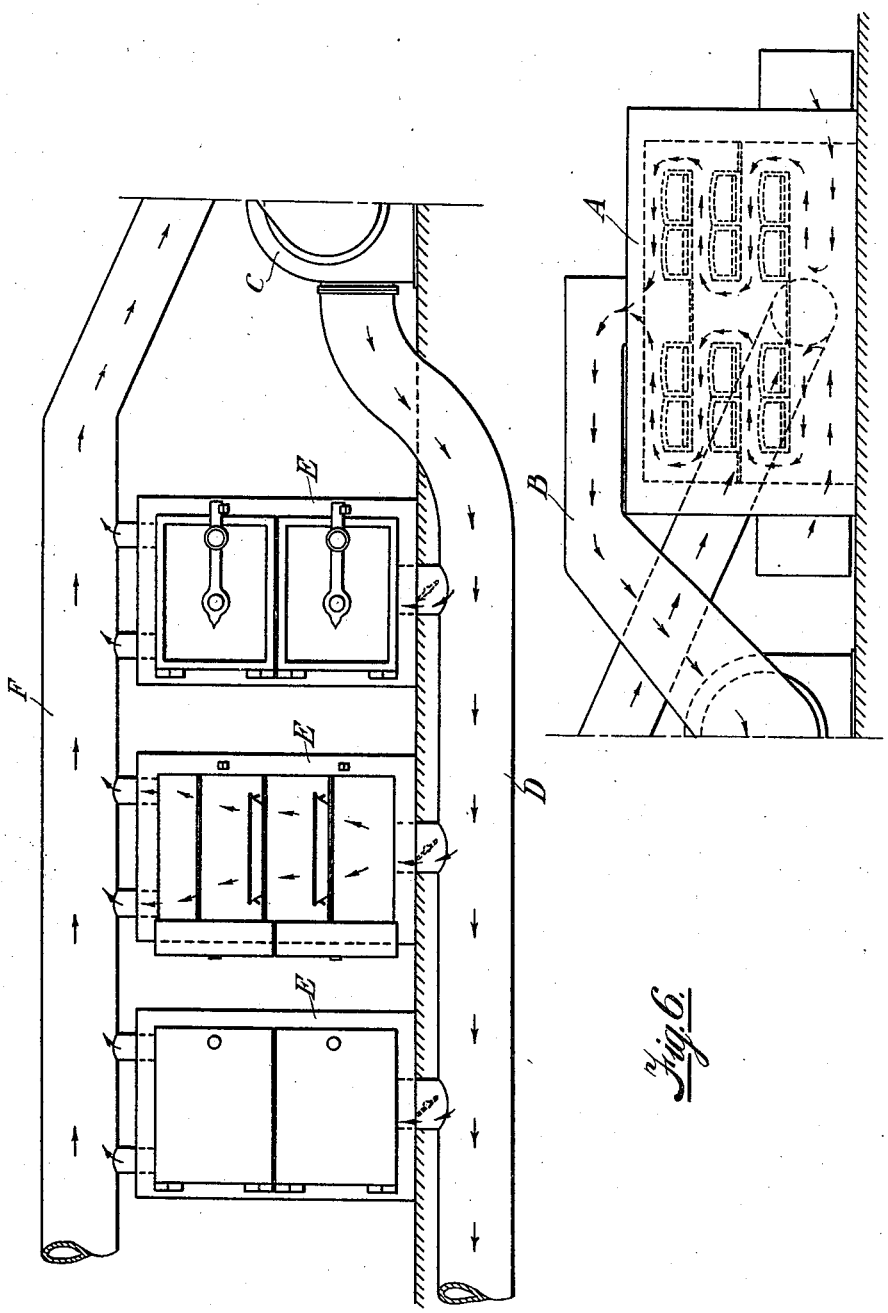
Figure 6 is a diagram showing the adaptation of either form of heater to large scale cookery.

Figure 6 illustrates diagrammatically the application of the invention to cookery on a large scale such as is necessary in hotels, A indicating an air heater of the form shown in Figures 1–3 or 4 and 5. The hot air outlet is connected by a conduit B with a fan C by which the hot air is delivered through a second conduit D to the base of a series of cooking ranges E from the upper ends of which the exhausted air is returned by a conduit F to the inlet ports of the heater A. In this manner a constant supply of uniformly heated air can be delivered to any form of cooking apparatus.

I claim:

1. Apparatus for heating air comprising a casing, a number of heat distributing conduits disposed within said casing, a plurality of hollow heat distributing elements projecting from the top of each conduit, and means for causing air to circulate through said casing and around said conduits.

2. Apparatus for heating air comprising a casing a number of heat distributing conduits disposed within said casing, a plurality of hollow cylindrical heat distributing elements projectng from the top of each conduit and communicating within the interior thereof, and means for circulating air to be heated around said conduits.

3. Apparatus for heating air comprising a casing, a plurality of heat distributing conduits disposed within said casing, a curved upper surface to each conduit, a plurality of hollow heat distributing elements projecting from the upper surface of each conduit and baffles within said casing to compel air to pass across the tops of said conduits in a direction at right angles to the longitudinal axis of the conduits.

4. Apparatus for heating air comprising a casing a number of internally heat distributing conduits disposed within said casing, a plurality of hollow cylindrical heat distributing elements projecting from the top of each conduit and communicating with their interior thereof, a plurality of fins projecting laterally around each of said elements, and means for circulating air to be heated around said conduits.

5. Apparatus for heating air comprising a casing, a number of heat distributing conduits disposed within said casing a plurality of hollow heat distributing elements projecting from said conduits, air inlets and outlets in said casing and a fan maintaining circulation of air through said casing and an apparatus to be heated.

6. Apparatus for heating air comprising an insulated casing a plurality of heat distributing conduits disposed in vertical rows within said casing, a plurality of hollow cylindrical heat distributing elements projecting from the upper surface of each of said conduits, baffles disposed between the inner rows of conduits and between the outer rows of conduits and the casing walls and air inlets and outlets in said casing walls.

7. Apparatus for heating air comprising a casing, a plurality of heat distributing conduits disposed therein in vertical rows a plurality of externally ribbed hollow cylindrical heat distributing elements projecting from the upper surface of each of said conduits, baffles disposed between the inner rows of conduits and between the outer rows of conduits and the casing walls and air inlets and outlets in said casing walls.

In witness whereof I affix my signature.

ROWLAND GREENWOOD.